(12) United States Patent
Eberlein (10) Patent No.: US 10,073,483 B2
(45) Date of Patent: Sep. 11, 2018

(54) BANDGAP REFERENCE CIRCUIT WITH CAPACITIVE BIAS

(71) Applicant: INTEL CORPORATION, Santa Clara, CA (US)

(72) Inventor: Matthias Eberlein, Holzkirchen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/088,345

(22) Filed: Apr. 1, 2016

(65) Prior Publication Data

US 2017/0285680 A1   Oct. 5, 2017

(51) Int. Cl.
| G05F 1/10 | (2006.01) |
| G05F 3/24 | (2006.01) |
| H02M 3/07 | (2006.01) |

(52) U.S. Cl.
CPC .............. *G05F 3/245* (2013.01); *H02M 3/07* (2013.01)

(58) Field of Classification Search
CPC .. G05F 3/30; G05F 3/267; G01K 7/01; G01K 7/015
See application file for complete search history.

(56) References Cited

U.S. PATENT DOCUMENTS

| 8,816,756 | B1 | 8/2014 | Eberlein | |
| 9,013,231 | B1 * | 4/2015 | Manea | G05F 3/08 327/539 |
| 9,122,290 | B2 | 9/2015 | Eberlein | |
| 9,240,775 | B2 | 1/2016 | Eberlein | |
| 2007/0096702 | A1 * | 5/2007 | Rasmus | G05F 1/575 323/281 |
| 2012/0169413 | A1 * | 7/2012 | Choi | G05F 3/30 327/539 |
| 2013/0228773 | A1 * | 9/2013 | Kurokawa | H01L 29/26 257/43 |
| 2014/0139246 | A1 * | 5/2014 | Chuang | G01R 31/2874 324/750.06 |
| 2015/0310932 | A1 * | 10/2015 | Nappi | G11C 29/021 714/718 |
| 2015/0365112 | A1 * | 12/2015 | Alon | G05F 3/20 375/297 |

OTHER PUBLICATIONS

Prior Art CMOS Bandgap Voltage Reference, Mar. 1, 2016.
Hellen, E., "Verifying the Diode-Capacitor Circuit Voltage Decay", American Journal of Physics, vol. 71, No. 8, Aug. 2003, pp. 797-800.

\* cited by examiner

*Primary Examiner* — Sibin Chen
(74) *Attorney, Agent, or Firm* — Compass IP Law, PC (57) ABSTRACT

An apparatus is described having a reference voltage circuit. The reference voltage circuit includes a diode to receive first and second currents having first and second respective current densities, where, the first and second current densities are different and determined by circuitry that precisely controls the respective amount of time the first and second currents flow into the diode. The reference voltage circuit also comprises circuitry to form a reference voltage by combining first and second voltages generated from respective voltages of the diode that result from the first and second currents flowing through the diode.

18 Claims, 13 Drawing Sheets

BANDGAP REFERENCE CIRCUIT WITH CAPACITIVE BIAS

FIELD OF INVENTION

The field of invention pertains generally to the semiconductor arts, and, more specifically, to a bandgap reference circuit with capacitive bias.

BACKGROUND

Circuits often require a precise voltage level. As such, reference voltage circuits have been developed to generate a precise voltage level that, ideally, does not drift or largely vary with, e.g., temperature changes that the reference voltage circuit may be subjected to. One type of reference voltage circuit, referred to as a bandgap voltage reference circuit, generates a proportional to absolute temperature (PTAT) voltage and a proportional to complementary temperature (CTAT) voltage. The PTAT voltage is derived from a pair of voltages that are generated from different current densities through a P-N junction. The accuracy of the reference voltage that is output by the circuit is most sensitive to the PTAT voltage, since the PTAT voltage is usually multiplied by a certain factor (~10) to achieve temperature-compensation at the reference voltage output. In turn, the PTAT voltage is proportional to the logarithm of the ratio of the two different current densities.

A problem with integrating a bandgap reference voltage circuit onto a semiconductor chip manufactured with a logic manufacturing process is that the ratio of the two current densities is typically limited to one order of magnitude (e.g., no higher than 50). The relatively small current density ratio results in a bandgap reference circuit that is more sensitive to circuit non-idealities, like amplifier or device mismatch, and may therefore not be suitably accurate or stable for its particular application. Moreover, the ratio of current densities in prior art solutions depends on the matching of devices, like MOS transistors or resistors, which limits the achievable accuracy. In modern technologies it is further difficult to integrate analog structures like resistors, current sources or amplifiers, with sufficient performance (ideality). The requirements for a technology would be relaxed, if a reference circuit does not need such components, but can operate by similar means like the digital core circuitry.

FIGURES

A better understanding of the present invention can be obtained from the following detailed description in conjunction with the following drawings, in which.

DETAILED DESCRIPTION

A solution is to use "capacitive bias" in which first and second charged capacitors behave as the source of potential that drives first and second current densities through a P-N junction. The first and second current densities correspond to the pair of current densities whose ratio determines the PTAT voltage. The combination of P-N junction and capacitors operate in a region where each of their respective voltage decay behavior varies according to the natural log of time without any substantial dependence on (initial) biasing conditions or parasitics.

As such, extremely large current density ratios can be achieved if one of the capacitors discharges for a small amount of time while the other of the capacitors discharges for a longer amount of time. Here, current density ratios of perhaps 4 or 5 orders of magnitude (e.g., 10,000) can be produced which, in turn, corresponds to a significantly larger generated PTAT voltage and a more accurate/stable reference voltage. Moreover, as described in more detail below, in various embodiments, the current densities can be accurately controlled by time, rather than by device sizing.

Figure 1A:
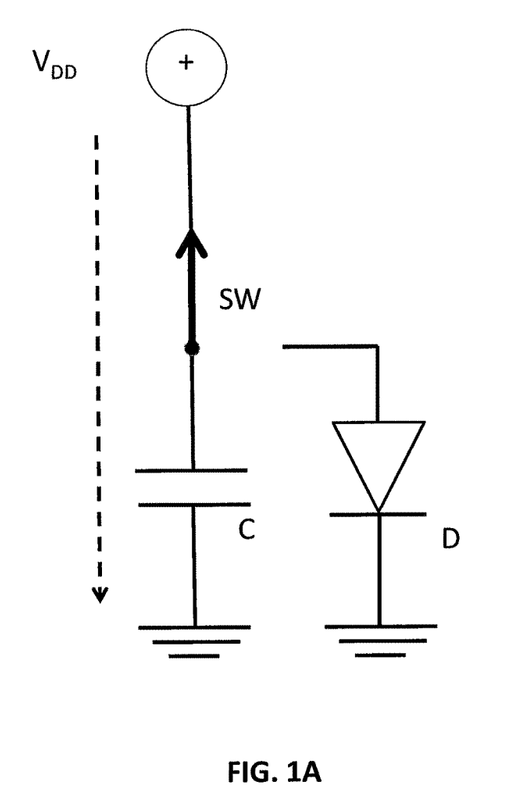
FIGS. 1a and 1b show capacitive discharge behavior.
Figure 1B:
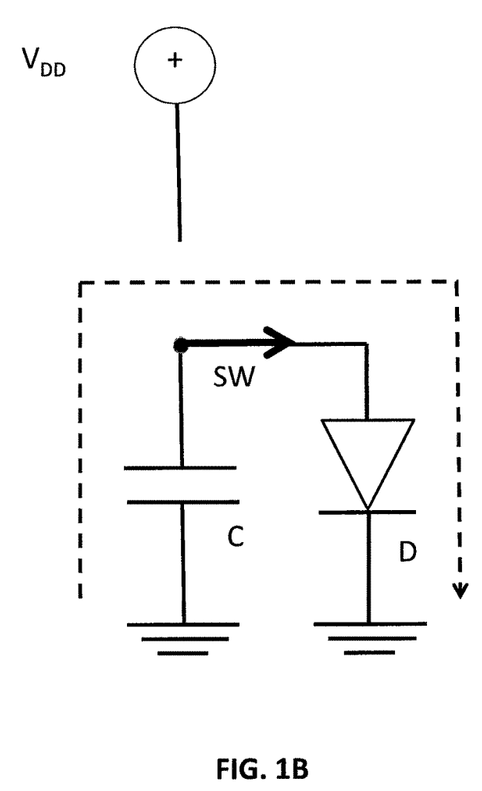

FIGS. 1a and 1b show a simple capacitor discharge circuit whose behavior corresponds to the capacitive bias principle discussed just above. As shown in FIG. 1a, initially, a switch SW is set in a first position that permits a supply voltage VDD to charge a capacitor C. After the capacitor is charged (e.g., approximately to the supply voltage), as shown in FIG. 1B, the switch is closed in a second position to permit the charged capacitor to discharge into a P-N junction (diode D).

It can be shown that the voltage across the diode D, which corresponds to the decaying voltage of the capacitor C, will behave as expressed in Eqn. 1 below:

$$V_D(t) = -V_T(\ln(1-(1-\exp(-V_{DD}/V_T))(\exp(-I_S/(CV_T))t)) \quad \text{Eqn. 1}$$

Where $V_T$ is the thermal potential (i.e., kT/q where k is Boltzman's constant, T is the temperature and q is elemental charge), $V_{DD}$ is a supply voltage, $I_S$ is the saturation current of the diode, C is the capacitance of the capacitor and t is the time where t=0 when the switch is closed to connect the capacitor C to the diode D.

Of importance, Eqn. 1 can be approximated as three different equations depending on the value of t. That is, referring to equations 2a, 2b and 2c below, a first equation 2a approximates Eqn. 1 for small values of t (e.g., less than 50 ns), a second equation 2b approximates Eqn. 1 for medium values of t (e.g., greater than 50 ns but less than 200 µs) and a third equation for large values of t (e.g, greater than 200 µs).

$$V_D(t) = -V_T\ln((\exp(-V_{DD}/V_T) + ((-I_S/(CV_T))t)) \quad \text{Eqn. 2a}$$

$$V_D(t) = -V_T\ln((I_S/(CV_T))t)) \quad \text{Eqn. 2b}$$

$$V_D(t) = -V_T\ln(1-\exp(-I_S/(CV_T))t)) \quad \text{Eqn. 2c}$$

Notably, the medium time approximation of Eqn. 2b varies as the natural log of time and does not depend on $V_{DD}$. As such, a bandgap reference voltage circuit can be built that uses the relationship expressed in FIG. 2b to precisely control the voltage across the PN junction, and, in so doing, precisely control the resulting current density through the PN junction.

As explained in more detail below, the precise control is effected by precisely controlling the amount of time that the capacitor is allowed to discharge. Thus, with two capacitors that are precisely controlled in this manner, one for a shorter time and one for a longer time, a large dynamic range between the respective current densities that result from their discharge can be realized. A large dynamic range between these current densities corresponds to a large current density ratio, which, as described just above, can be used to generate a large PTAT voltage and corresponding accurate/stable output reference voltage.

FIGS. 2a through 2d show the basic principle of operation of a capacitive bias based bandgap reference circuit. As observed in FIG. 2a, during a first phase, a first circuit switching state connects a supply voltage $V_{DD}$ to first and second capacitors C1, C2 to charge them approximately to the supply voltage $V_{DD}$. After the capacitors C1 and C2 are charged, the first phase ends and a second phase begins. Here, FIG. 3 shows the behavior of the voltage on both capacitors C1 and C2. As can be seen from FIG. 3, the voltages of both capacitors C1 and C2 charge together in lock stop during the first phase over time T1.

Figure 2A:
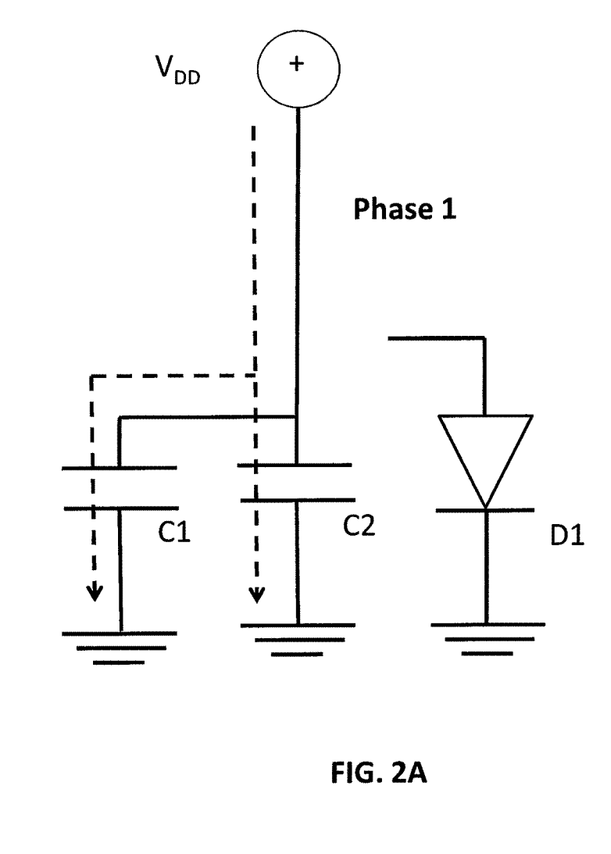
FIGS. 2a through 2d show different phases of operation of a bandgap reference circuit having capacitive bias.
Figure 2B:
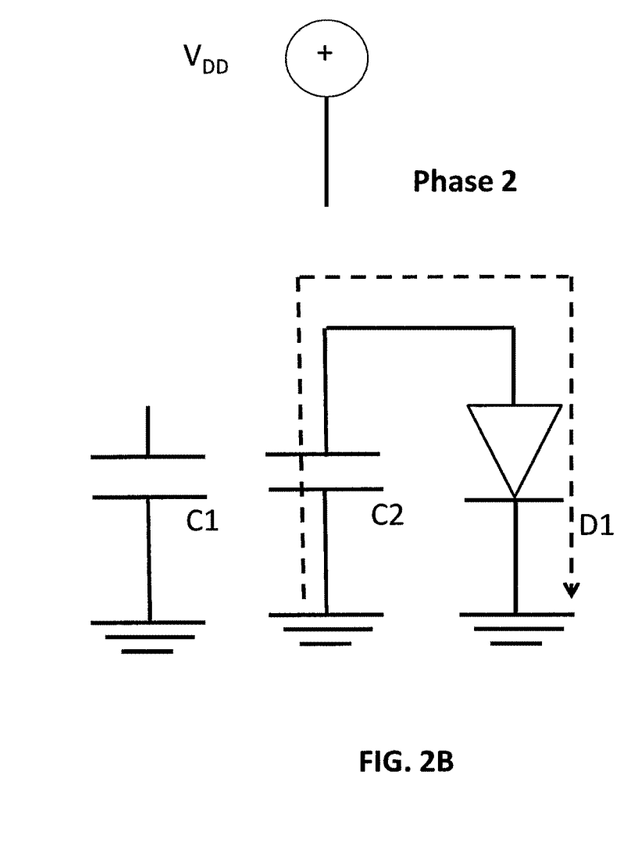
Figure 3:
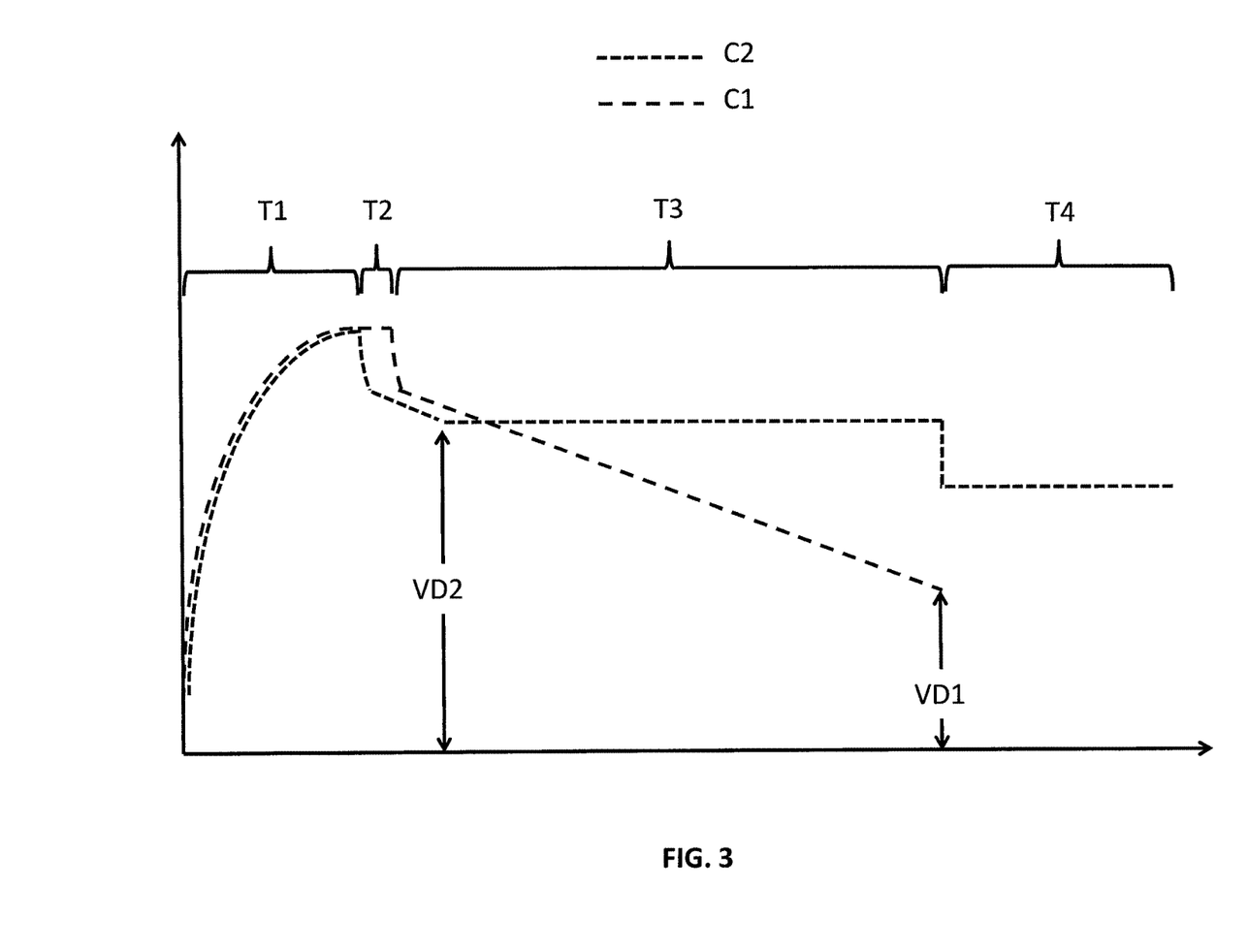
FIG. 3 shows exemplary voltages of the four phases of FIGS. 2a through 2d.

As observed in FIG. 2b, the second phase includes a second switching state in which capacitor C2 is permitted to discharge through the diode D1. In an embodiment, the amount of time T2 in which capacitor C2 is permitted to discharge is tightly controlled and corresponds to a medium amount of time in which the discharge behave is largely defined by Equation 2b above. Here, as discussed at length above, Equation 2b describes decaying voltage behavior that varies as the natural log of the time that the capacitor is permitted to discharge. As such, FIG. 3 shows the voltage of capacitor C2 decaying according to natural log behavior for time T2 during the second phase. When the tightly controlled time period T2 that C2 is permitted to discharge elapses, the second phase ends and the third phase begins.

Figure 2C:
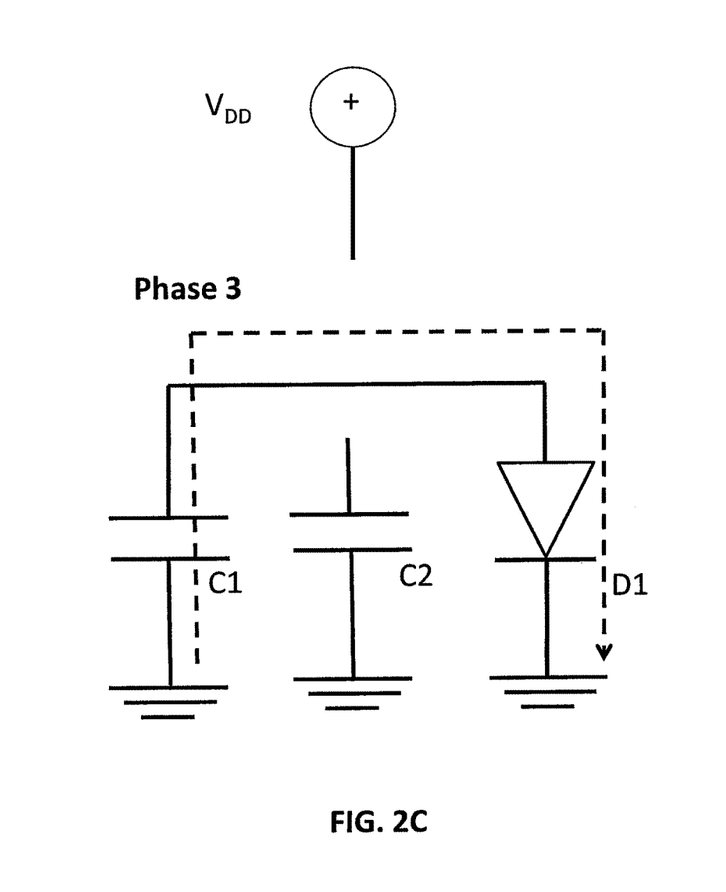

As observed in FIG. 2c, the third phase includes a third switching state in which capacitor C1 is permitted to discharge through the diode D1. In an embodiment, as with the discharge of capacitor C2 during phase T2, the amount of time T3 that capacitor C1 is permitted to discharge is tightly controlled and is within a time period in which the behavior of the discharge is largely described by Eqn. 2b above. However, capacitor C1 is permitted to discharge for a noticeably longer time period T3 than capacitor C2 is permitted to discharge T2. As such, as observed in FIG. 3, the voltage of capacitor C1 decays to a noticeably lower voltage level VD1 than the level VD2 that capacitor C2 decayed to.

The difference in these voltage levels VD1, VD2 corresponds to two significantly different current densities that flow through diode D1 which, as described at length above, corresponds to a much higher current density ratio than is typical for a bandgap reference voltage circuit. For instance, current densities having ratios that are on the order of two orders of magnitude (100s), three orders of magnitude (1000s), four orders of magnitude (10000s) or even five orders of magnitude (100000s) are possible.

As described in more detail below, in various embodiments, the second and third phases and their corresponding controlled capacitor discharge time periods T2, T3 are designed to overlap rather than be disjointed as observed in FIG. 3 (e.g., both phases start at the same time at the end of the first phase with the second phase ending noticeably before the third phase ends).

Figure 2D:
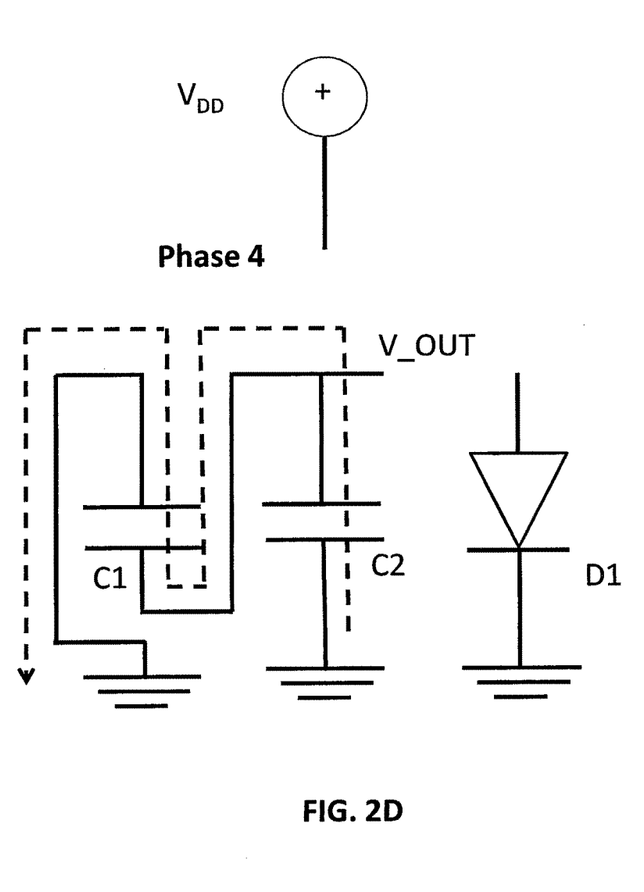

After the amount of time T3 that capacitor C1 is permitted to discharge elapses, the third phase ends and a fourth phase begins. As observed in FIG. 2d, in the fourth phase a fourth switching state is engaged in which the voltages of the two capacitors are effectively subtracted from one another and the voltage at the node between the two capacitors is expressed as:

$$V\_OUT = (C2/(C1+C2))(VD2-((C1/C2)VD1)) \qquad \text{Eqn. 3}$$

and where V_OUT further corresponds to the reference voltage generated by the circuit. Here, the four phases are continuously repeated to continuously generate the V_OUT reference voltage.

Figure 4:
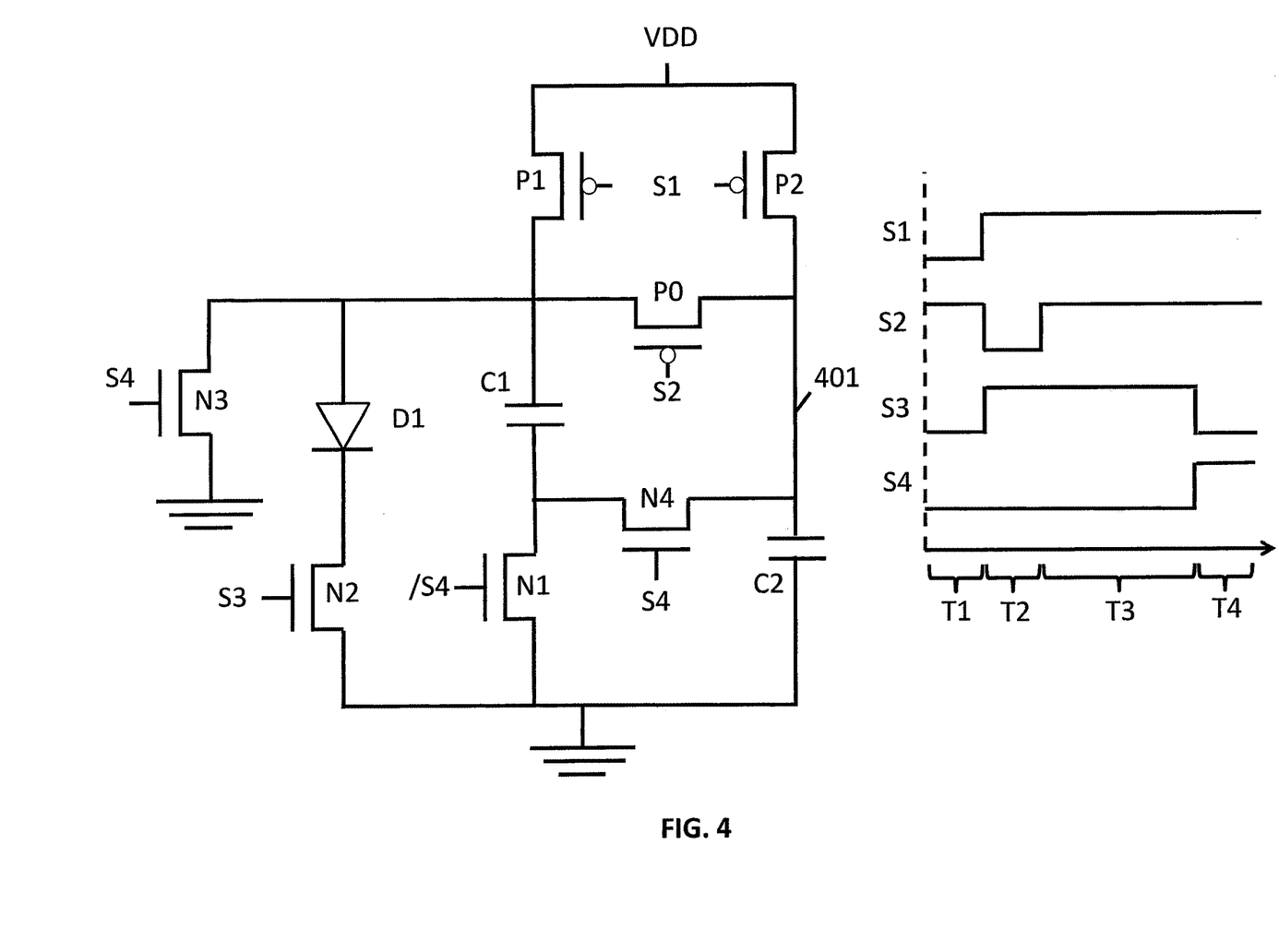
FIG. 4 shows an embodiment of a bandgap reference circuit having capacitive bias.

FIG. 4 shows one embodiment of a circuit that is designed consistently with the principles discussed just above with respect to FIGS. 2a through 2d. FIGS. 5a through 5d show the different switching states of the circuit of FIG. 4. FIG. 6 shows the capacitor voltages.

Figure 5A:
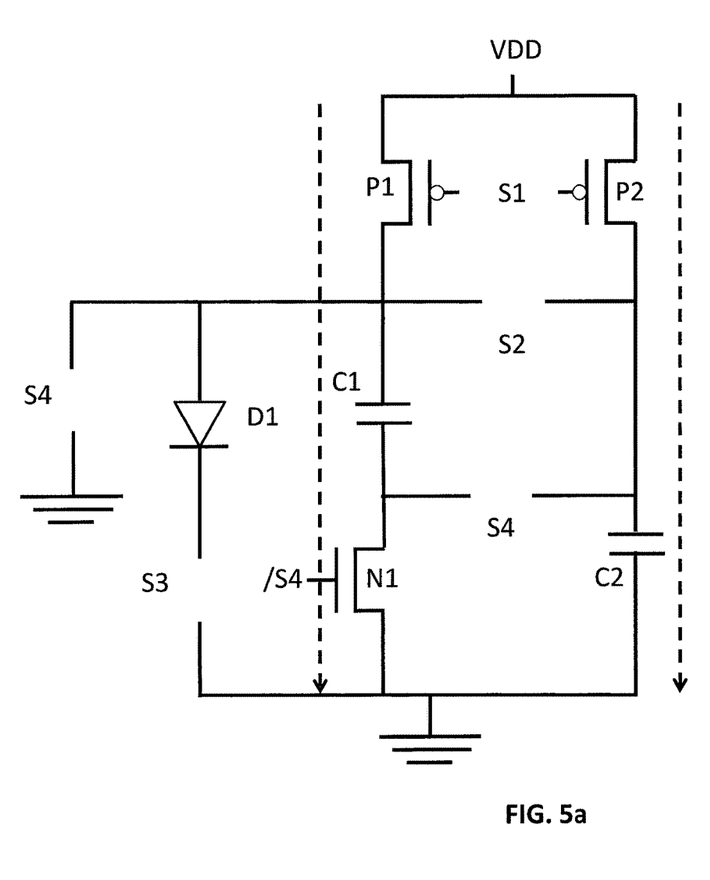
FIGS. 5a through 5e show different switch states of the circuit of FIG. 4.
Figure 6:
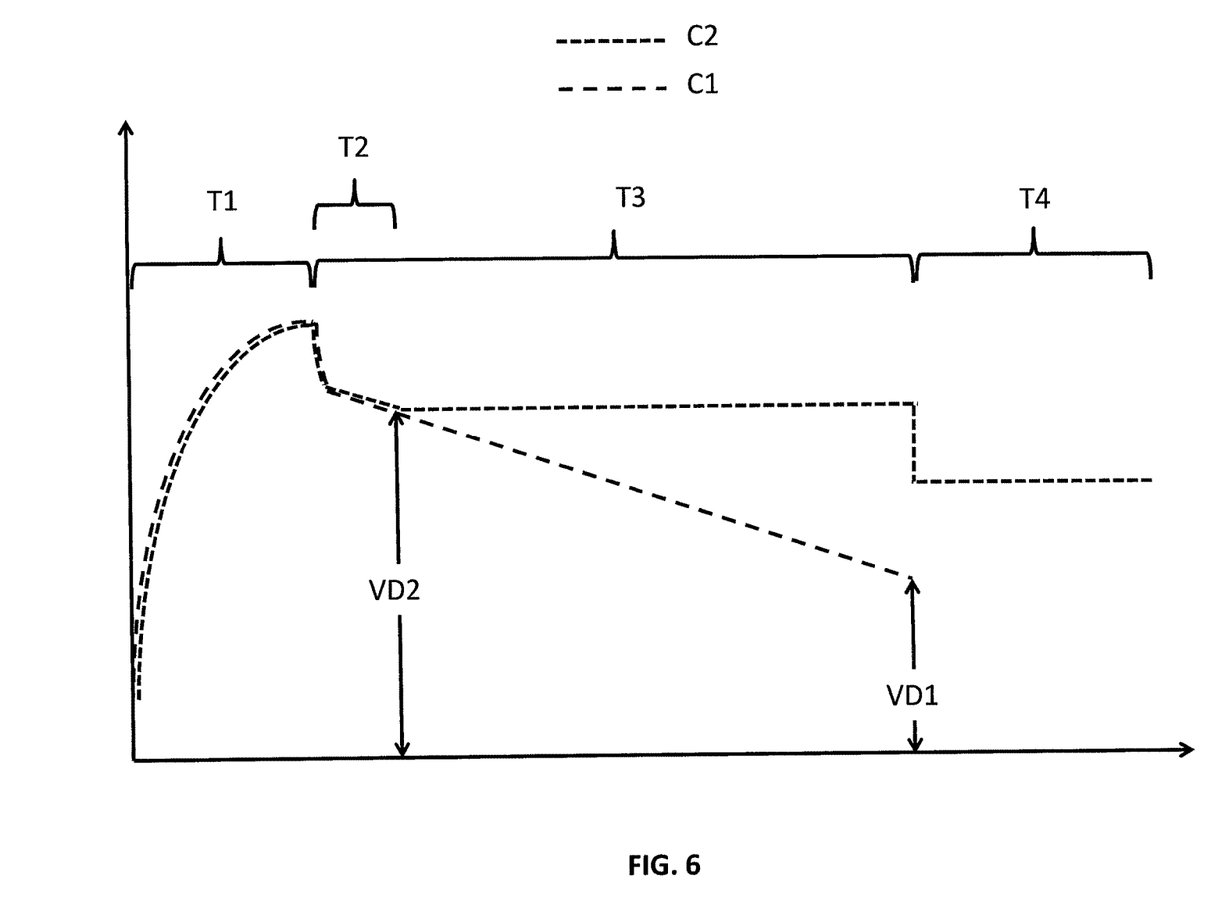
FIG. 6 shows exemplary waveforms of the circuit of FIG. 4.

According to the operation of the circuit of FIG. 4, as observed in FIG. 5a, in the first phase during time T1 transistors P1, P2 and N1 are on while transistors P0, N2, N3 and N4 are off. With this switching arrangement, a direct current path from the supply voltage node to the ground references is established through both capacitors C1, C2. As a consequence, both of the capacitors C1, C2 will be charged approximately to the supply voltage VDD. As such, as observed in FIG. 6, the voltage levels of both capacitors charge together up to the supply voltage within time T1.

As alluded to above, in various embodiments, the discharge phases of the two capacitors may be overlapped such that they both start discharging at the same time but one of the capacitors stops discharging before the other of the capacitors stops discharging. The particular circuit of FIG. 4 conforms to such an approach. As such, the second and third phases start at the same time at the end of the first phase.

Figure 5B:
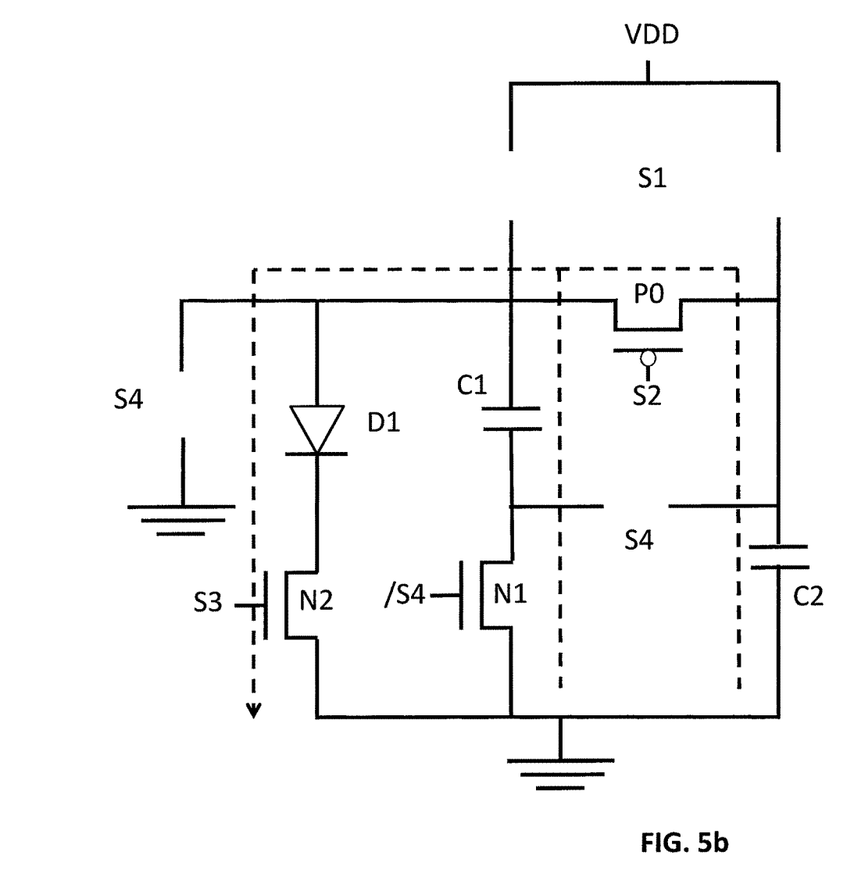

As observed in FIG. 5b, the combined second and third phases (which takes place over time T2) includes the discharging of the both capacitors C1 and C2 into diode D1. The discharge of capacitor C2 is effected by turning transistors P1 and P2 off, keeping transistors N3 and N4 off and turning transistors P0 and N2 on. Additionally, the third phase, in which capacitor C1 discharges into diode D1, is effected by keeping transistor N1 on. With this switch state, both capacitors C1 and C2 are able to discharge into diode D1. Here, with both of capacitors C1 and C2 discharging together, referring to FIG. 6, note that the voltage of both capacitors fall together according to the logarithmic behavior of Eqn. 2b.

Figure 5C:
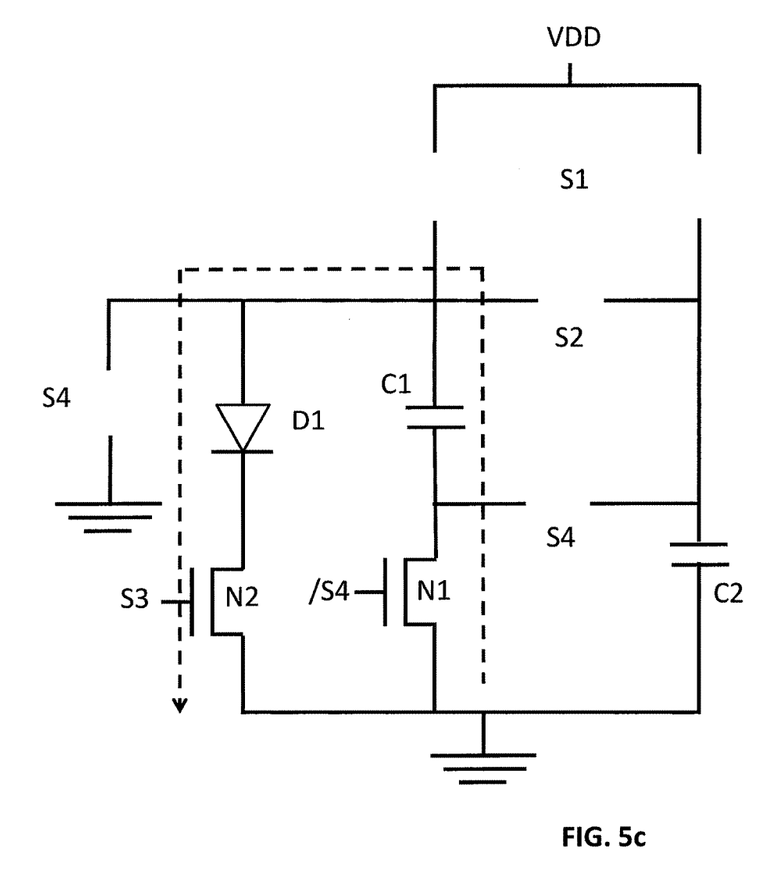

After the shorter time period T2 for discharging capacitor C2 has elapsed, as observed in FIG. 5c, transistor P0 is turned off which prevents any further discharge from capacitor C2 into diode D1. Here, referring to FIG. 6, C2 is isolated so that it holds its voltage level VD2. The third phase continues and capacitor C1 continues to discharge into diode D1. As such, its voltage continues to decay in accordance with Equation 2b.

Figure 5D:
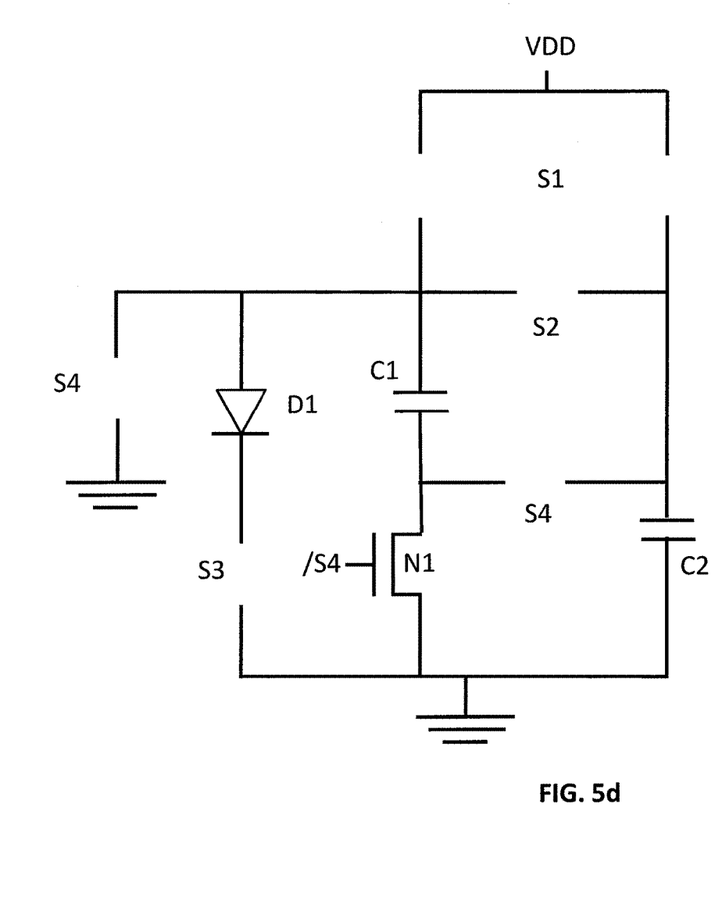

Eventually the time at which C1 is to stop discharging T3 is reached and, as observed in FIG. 5d, transistor N2 is turned off to prevent any further current flow through the diode D1. That is, the leg of the circuit that includes diode D1 is open so that no current can flow through diode D1. Preventing any current flow through diode D1 effectively stops capacitor C1's discharge into diode D1. As observed in FIG. 6, the voltage level of capacitor C1 has fallen to a lower level VD1 than the voltage level VD2 that capacitor C2 is holding at.

With the time for the discharge of capacitor C1 having elapsed, a fifth switch state is effected for the fourth phase in which the voltage on capacitor C1 is subtracted from the voltage on capacitor C2 to generate an output voltage that corresponds to Eqn. 3 at output node 401, 501. Thus, as observed in FIG. 5e, transistors N3 and N4 are turned on and transistor N1 is turned off. This switching arrangement causes the current path depicted in FIG. 5e to arise.

Figure 7:
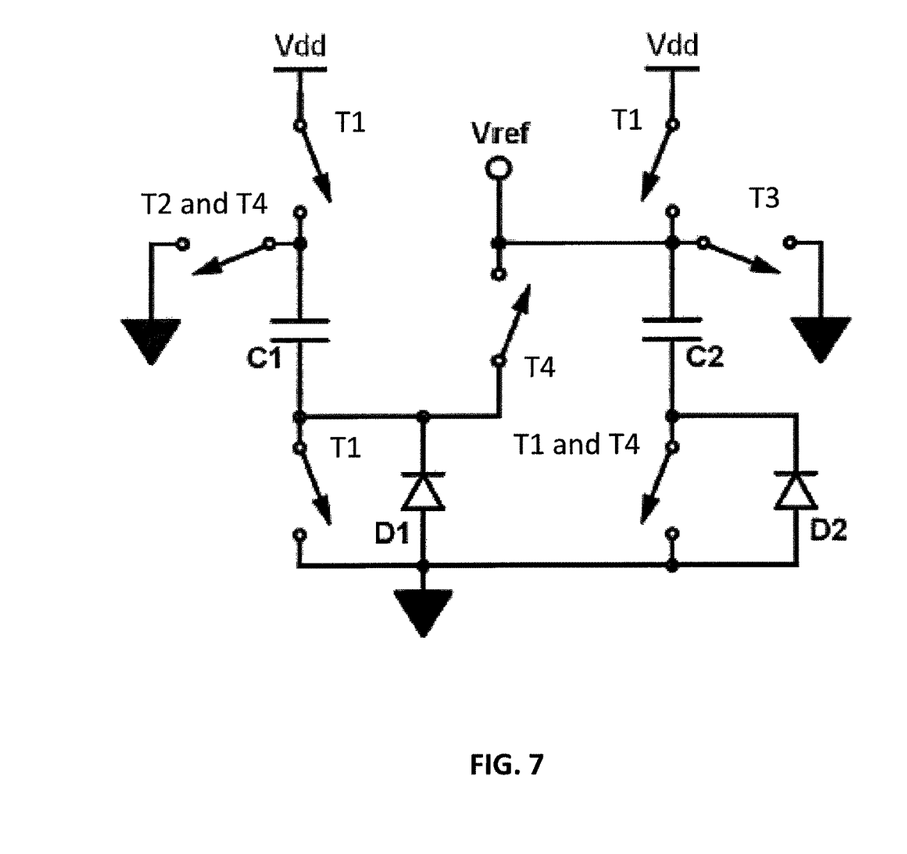
FIG. 7 shows another bandgap reference circuit.

It is pertinent to point out that various other implementations are possible to achieve a bandgap reference with capacitive bias (e.g., by using passive or active (amplifiers) multiplication). For example, as observed in the circuit of FIG. 7, the same technique can also operate with negative voltages and thereby realize a (reverse) bandgap reference circuit with nwell substrate diodes. Nwell substrate diodes are normally reverse biased, but more reliable and precise than PNP devices, due to the buried nature of the nwell.

As another example, circuits having only one capacitor instead of two capacitors may be implemented. For example, the same principle works if a single capacitor is used, where the single capacitor is repeatedly re-charged, then discharged through a diode, and its remaining voltage "transferred" by a suitable charge-transfer mechanism (e.g. a switched-capacitor amplifier] to a summing node/component.

Figure 5E:
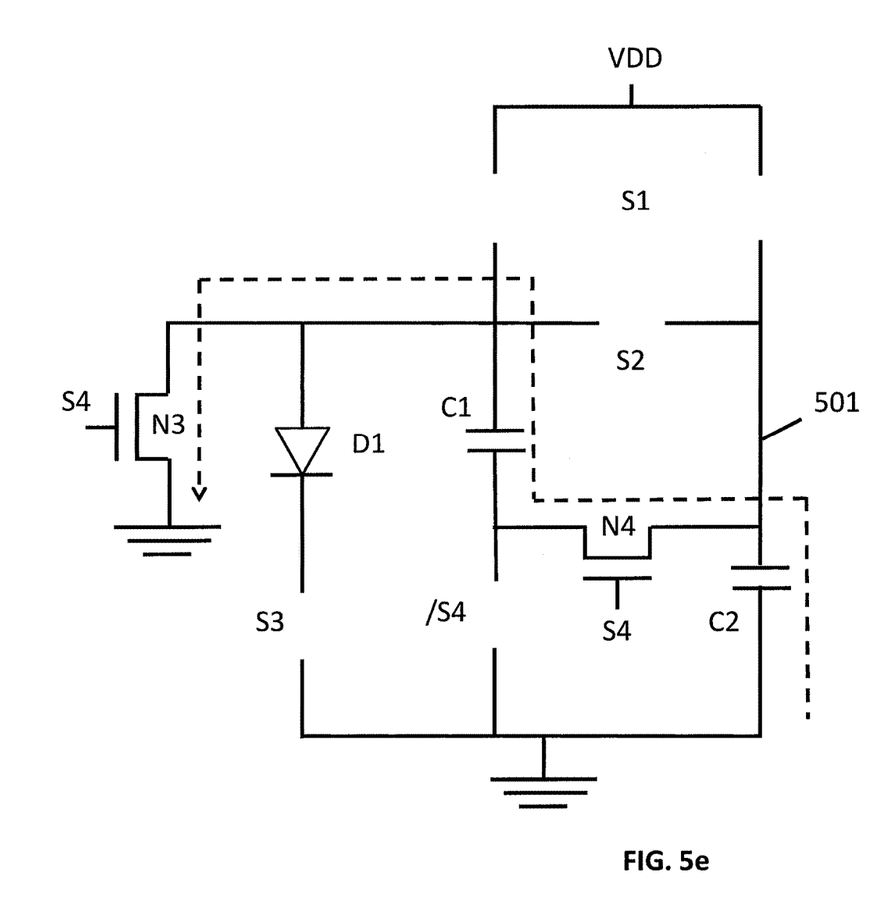

Further still, in circuits having more than one capacitor, a series connection of the capacitors is not necessary to perform the intended summation of voltages VD1 & VD2 (or scaled versions of the same). Here, a parallel combination of capacitors is possible (e.g., FIG. 5*e* shows a parallel combination of +VD2 and −VD1). Alternatively, summation through active circuitry, such as a switched-cap amplifier, can be used. Generally, regardless of the precise implementation, a "charge-transfer" is performed resulting in effective voltage addition (maybe including some scaling and therefore different to Eqn. 3), to reach the same basic function of temperature compensated output voltage Although the circuit diagrams discussed above do not depict the circuitry that generates the appropriate signals for switching transistors into an on or off state, it should be understood that such circuits exist and have not been shown purely for illustrative ease.

Figure 8:
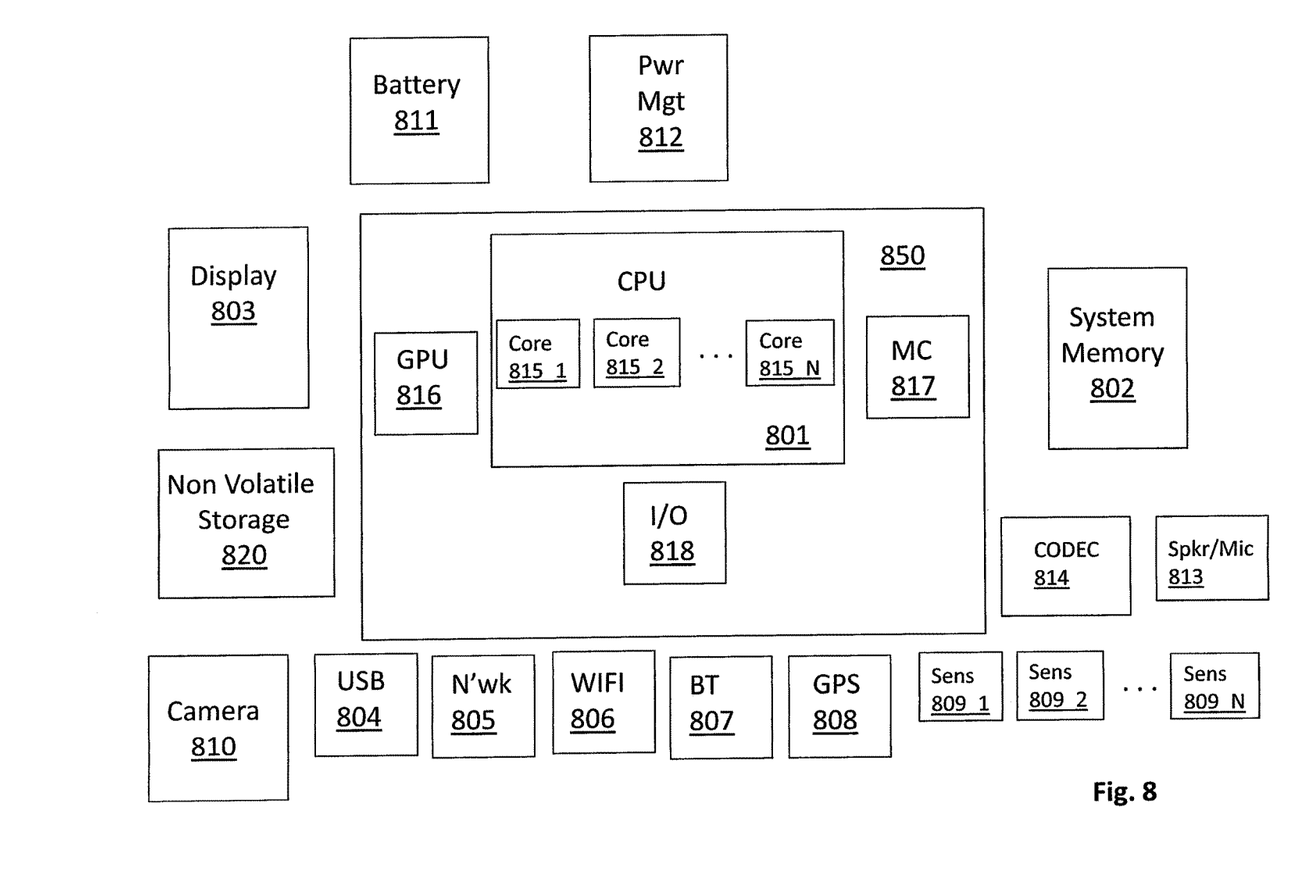
FIG. 8 shows a computing system.

FIG. 8 shows a depiction of an exemplary computing system 800 such as a personal computing system (e.g., desktop or laptop) or a mobile or handheld computing system such as a tablet device or smartphone, or, a larger computing system such as a server computing system. The computing system may contain a capacitive bias bandgap reference circuit as described above.

As observed in FIG. 8, the basic computing system may include a central processing unit 801 (which may include, e.g., a plurality of general purpose processing cores and a main memory controller disposed on an applications processor or multi-core processor), system memory 802, a display 803 (e.g., touchscreen, flat-panel), a local wired point-to-point link (e.g., USB) interface 804, various network I/O functions 805 (such as an Ethernet interface and/or cellular modem subsystem), a wireless local area network (e.g., WiFi) interface 806, a wireless point-to-point link (e.g., Bluetooth) interface 807 and a Global Positioning System interface 808, various sensors 809_1 through 809_N (e.g., one or more of a gyroscope, an accelerometer, a magnetometer, a temperature sensor, a pressure sensor, a humidity sensor, etc.), a camera 810, a battery 811, a power management control unit 812, a speaker and microphone 813 and an audio coder/decoder 814. The above described capacitive bias bandgap reference circuit may be specifically used, for instance, to generate a reference voltage within a wireless interface circuit such as a cellular/RF interface circuit that is integrated on a system-on-chip having the processing cores and the memory controller.

An applications processor or multi-core processor 850 may include one or more general purpose processing cores 815 within its CPU 801, one or more graphical processing units 816, a memory management function 817 (e.g., a memory controller) and an I/O control function 818.

The general purpose processing cores 815 typically execute the operating system and application software of the computing system. The graphics processing units 816 typically execute graphics intensive functions to, e.g., generate graphics information that is presented on the display 803. The memory control function 817 interfaces with the system memory 802. The system memory 802 may be a multi-level system memory having, e.g., an emerging three dimensional non-volatile memory technology at at least one of the levels.

Each of the touchscreen display 803, the communication interfaces 804-807, the GPS interface 808, the sensors 809, the camera 810, and the speaker/microphone codec 813, 814 all can be viewed as various forms of I/O (input and/or output) relative to the overall computing system including, where appropriate, an integrated peripheral device as well (e.g., the camera 810). Depending on implementation, various ones of these I/O components may be integrated on the applications processor/multi-core processor 850 or may be located off the die or outside the package of the applications processor/multi-core processor 850.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a reference voltage circuit comprising:
a diode to receive first and second currents having first and second respective current densities, where, the first and second current densities are different and determined by circuitry that precisely controls the respective amount of time the first and second currents flow into the diode, a first amount of time during which the first current is allowed to flow into the diode being different than a second amount of time during which the second current is allowed to flow into the diode and wherein a first time period exists in which both the first and second currents flow into the diode and a second time period exists in which one but not the other of the first and second currents flow into the diode;

wherein the reference voltage circuit comprises circuitry to form a reference voltage by combining first and second voltages generated from respective voltages of the diode, the first voltage resulting from the first current flowing through the diode, the second voltage resulting from the second current flowing through the diode; and, first and second capacitors to respectively hold the first and second voltages.

2. The apparatus of claim 1 further comprising third and fourth capacitors to source the first and second currents by respective discharges into the diode, and where the respective discharges of the third and fourth capacitors overlap in time.

3. The apparatus of claim 2 wherein a ratio of the current densities of the respective discharges of the third and fourth capacitors is greater than 100.

4. The apparatus of claim 1 wherein the first and second capacitors are also to pre-charge and discharge into the diode to respectively generate the first and second currents.

5. The apparatus of claim 4 wherein a first of the capacitors is to discharge into the diode for a different amount of time than a second of the capacitors is to discharge into the diode.

6. An apparatus, comprising:
a bandgap reference voltage circuit having a PTAT voltage generated from a current density ratio greater than 150.

7. The apparatus of claim 6 wherein the bandgap reference voltage circuit is integrated on a semiconductor chip manufactured with a logic manufacturing process.

8. The apparatus of claim 6 wherein the PTAT current density ratio is within a range of greater than 150 to 100,000.

9. The apparatus of claim 8 wherein the PTAT current density ratio is within a range of greater than 150 to 10,000.

10. The apparatus of claim 6 wherein the bandgap reference voltage circuit comprises:
a reference voltage circuit comprising:
a diode to receive first and second currents having first and second respective current densities, where, the first and second current densities are different and determined by circuitry that precisely controls the respective amount of time the first and second currents flow into the diode;
wherein the reference voltage circuit comprises circuitry to form a reference voltage by combining first and second voltages generated from respective voltages of the diode, the first voltage resulting from the first current flowing through the diode, the second voltage resulting from the second current flowing through the diode.

11. The apparatus of claim 10 wherein the reference voltage circuit comprises a first capacitor and a second capacitor, wherein the first and second capacitors are to source the first and second currents by respective discharges into the diode, wherein the respective discharges of the first and second capacitors overlap in time, and wherein the first capacitor is to discharge into the diode for a different amount of time than the second capacitor is to discharge into the diode.

12. A computing system, comprising:
a plurality of processing cores;
a memory controller coupled to the processing cores;
a system memory coupled to the memory controller;
an interface circuit, said interface circuit comprising a reference voltage circuit, said reference voltage circuit comprising:
a reference voltage circuit comprising:
a diode to receive first and second currents having first and second respective current densities, where, the first and second current densities are different and determined by circuitry that precisely controls the respective amount of time the first and second currents flow into the diode, a first amount of time during which the first current is allowed to flow into the diode being different than a second amount of time during which the second current is allowed to flow into the diode and wherein a first time period exists in which both the first and second currents flow into the diode and a second time period exists in which one but not the other of the first and second currents flow into the diode;
wherein the reference voltage circuit comprises circuitry to form a reference voltage by combining first and second voltages generated from respective voltages of the diode, the first voltage resulting from the first current flowing through the diode, the second voltage resulting from the second current flowing through the diode; and,
first and second capacitors to source the first and second currents by respective discharges into the diode, and where the respective discharges of the first and second capacitors overlap in time.

13. The computing system of claim 12 wherein a ratio of the current densities of the respective discharges of the first and second capacitors is greater than 100.

14. The computing system of claim 12 wherein the first and second capacitors are to discharge into the diode in a forward biased direction by positive voltage.

15. The computing system of claim 12 wherein the first and second capacitors are to discharge into the diode in a forward biased direction by negative voltage.

16. The computing system of claim 12 wherein the first of the capacitors is to discharge into the diode for a different amount of time than the second of the capacitors is to discharge into the diode.

17. The computing system of claim 12 wherein the bandgap reference voltage circuit is integrated on a semiconductor chip manufactured with a logic manufacturing process.

18. The computing system of claim 17 wherein the processing cores, memory controller and interface circuit are integrated on a same semiconductor chip.

* * * * *